UNITED STATES PATENT OFFICE 2,337,123

METHOD OF PREPARING PHENOLIC COMPOUNDS

John Frank Olin, Grosse Ile, and John L. Tetley, Lincoln Park, Mich., assignors to Sharples Chemicals Inc., Philadelphia, Pa., a corporation of Delaware No Drawing. Application October 25, 1941, Serial No. 416,462

10 Claims. (Cl. 260—624)

The present invention is an improvement over the process of the patent to John F. Olin, 2,107,060, of February 1, 1938. Like the process of the invention of that prior patent, the present invention pertains to the manufacture of substituted phenols, cresols, naphthols, and other aromatic compounds having at least one hydroxyl radical substituted for a nuclear hydrogen atom. The invention relates primarily to the condensation of unsaturated hydrocarbons with the hydroxy aromatic compounds, and is applicable to the alkylation of all such hydroxy aromatic compounds as have unsubstituted nuclear hydrogen atoms capable of being replaced by an alkyl radical. An example of such a condensation reaction is the condensation of trimethyl ethylene with phenol to produce para-tertiary amyl phenol.

Like the process of prior Patent 2,107,060, the present invention was conceived in connection with research upon the problem of condensing olefin hydrocarbons with phenolic compounds to produce para-alkyl phenols, and it is particularly useful in connection with an operation of that character. In an operation of this kind, it is usually important that the desired para-alkyl compound be produced in a form in which it contains only a very small proportion of impurities such as di-alkyl phenols, sulfonic acids, ethers, ortho-alkyl phenols, and other compounds of incidental reactions which may occur in connection with the production of the para-alkyl compound desired.

In the practice of the invention of the prior patent referred to above, the phenolic compound to be alkylated is first reacted with an olefin or an acid extract of an olefin (both of these reactions will be referred to hereinafter as reaction with an olefin) until a reaction mixture is obtained which is intermediate between a crude physical mixture of the reactants and the desired alkyl phenol. The acid catalyst is thereafter neutralized, and the intermediate product of reaction is distilled to remove unreacted hydrocarbons from the mixture resulting from neutralization of the catalyst, and finally digested with an isomerization catalyst, such as aluminum chloride, to produce the desired para-alkyl phenol. At the conclusion of this digesting operation, the resulting reaction mixture is boiled and washed with water and neutralized with an alkali. After the completion of a thorough washing operation, usually involving a succession of washing steps, the material is fractionated to produce the desired para-alkyl phenol.

The present invention involves an improvement over the process of the prior patent, as discussed above, in that a rearranging catalyst is used in the digesting step which results in a number of advantages including production of a much purer product than is obtained in practice of the prior patent, thereby enabling the operator to effect an economy in the final step of purification, and to obtain a higher boiling final product, of greater purity and better color than is attainable by the process of the prior patent.

In the preferred practice of the present invention, the first step is similar to the first step in the practice of the invention of Grosscup Patent 2,115,332, and prior Patent 2,107,060, referred to above. The unsaturated hydrocarbon is mixed with the phenolic compound with which it is to be condensed, these ingredients being thoroughly agitated in the presence of an acid catalyst, until initial condensation takes place to produce a mixture containing unchanged phenol, ortho-alkyl phenol, di-alkyl phenol, the ether formed by condensation of the unsaturated hydrocarbon with the phenol, and perhaps also a small amount of the desired para-substituted phenol. In the case of the manufacture of para-tertiary amyl phenol, for example, phenol and trimethyl ethylene may be mixed in substantially equimolecular proportions and condensed by the catalytic effect of concentrated sulfuric acid used in an amount which may constitute between 0.5 and 1 cc. of concentrated acid for each gram mole of phenol condensed. This condensation may be carried out under reflux or in any suitable container equipped with cooling means for removing the exothermic heat of reaction from the mixture. The mixture is preferably maintained at a temperature between 40 and 60° C. during this stage of the condensation reaction, the preferred temperature being about 50° C. If a temperature of 50° C. is employed, pressure tight apparatus is used in order to avoid loss of amylene by distillation. While quantities of sulfuric acid which are less than 0.5 cc. per gram mole of phenol or greater than 1 cc. per gram mole may be employed, the use of a quantity of acid catalyst within these limits will ordinarily be sufficient to cause this initial condensation to proceed with reasonable rapidity. If the phenol contains water as an impurity, it may be desirable to use a larger quantity of acid than 1 cc. of acid per mole of phenol.

After the initial condensation reaction has proceeded to such a point that most of the phenol has been converted into ortho-alkyl phenol, ethers, and other phenolic derivatives as discussed above, the phenolic constituents of the reaction mixture are heated with an acid activated clay in finely divided condition to effect isomerization of the ortho-alkyl phenol, di-alkyl phenol, etc., to the desired para-alkyl phenol. In case the reaction mixture contains sulfuric acid in excess of the amount desired in the subsequent isomerization step, or in case it contains unreacted olefin to be removed prior to isomerization, the reaction mixture may be diluted with water prior to the performance of the isomerization step. The quantity of water added for best results may be approximately 10% of the volume of the reaction mixture to which it is added. The quantity of water employed may vary within wide limits, however, it being possible to use quantities amounting to between 5% and 100% of the volume of the reaction mass. By adding water, a part of the sulfuric acid is caused to stratify from the oily reaction mixture and may thus be removed. The added water also assists in the wet distillation of unreacted olefin, enabling the operator to remove this olefin with facility prior to adding clay and effecting isomerization of the intermediate reaction product.

The isomerization of the phenolic constituents of the reaction mixture is next accomplished by heating this reaction mixture, together with the activated clay, to a temperature between 100 and 170° C. The quantity of clay necessary to assist in the catalytic isomerization of the phenols will vary with the particular isomerization temperature employed. Thus, if isomerization is attempted at a temperature of 100° C. in the manufacture of tertiary amyl phenol, it is desirable that at least 10% of activated clay be added to the reaction mixture, but if this isomerization is accomplished at 160° C., as little as ½% of clay will give good results. We have obtained excellent results by the use of approximately 2% of a clay such as Tonsil or Retrol in cases in which the isomerization temperature was between 140 and 145° C. in manufacture of para-tertiary amyl phenol. Under these conditions, a satisfactory isomerization can be accomplished by heating the mixture to the indicated temperature for a period of about one hour. At the conclusion of the isomerization step, the activated clay is removed from the reaction mixture, any acid remaining in the mixture is neutralized, and the mixture subjected to distillation to obtain the desired phenolic derivative.

In the manufacture of alkyl phenols by condensing olefins containing four or more carbon atoms with hydroxy aromatic compounds, it is frequently desirable to employ mixtures of branched chain olefins with straight chain olefins in the condensation reaction, and to produce tertiary alkyl phenols to the exclusion of the secondary alkyl phenols which would be formed by condensation of the straight chain olefins with the hydroxy aromatic compounds. In such cases, the selective condensation of the branched chain olefins with the hydroxy aromatic compounds may be accomplished by appropriate control of the temperature, quantity of catalyst, and time of the initial condensation reaction as discussed above in the condensation of trimethyl ethylene with phenol. By proper control of the reaction, the condensation of the straight chain olefin content of the initial olefin mixture with the hydroxy aromatic compound may be substantially completely avoided. After the branch chain olefin has been selectively condensed with the hydroxy aromatic compound in this manner, the straight chain olefin content of the mixture (e. g., the pentene-2 in the manufacture of tertiary amyl phenol) is removed from the reaction mixture prior to the performance of the isomerization step. Thus, after dilution of the intermediate reaction mixture with water, the straight chain olefin may be removed from the mixture by distillation overhead together with a part of the water. There will then be left in the distillation apparatus a residue consisting of an oily phenolic layer containing the intermediate condensation reaction mixture which is later to be isomerized, together with a small water layer as a lower stratum. After removal of this water stratum, the phenolic reaction mixture may be isomerized by addition of an activated clay and treatment as discussed above.

While the invention has been discussed above as involving initial condensation of olefin with phenol by a first step which is similar to the first step of prior Patent 2,107,060, the process of the present invention is not necessarily limited to the accomplishment of the initial condensation step in this manner. Thus, isomerization of reaction mixtures containing ethers, ortho-alkyl phenol, etc., may be accomplished in the practice of the invention by treatment with an activated clay and a small amount of acid in the practice of the invention, regardless of the source of these mixtures. Examples of materials other than those discussed above which may be treated in this manner are intermediate phenolic condensation products obtained in the practice of the process of Thomas Patent 1,999,793, and Lee et al. patent, 2,050,188. Intermediate reaction products obtained in condensation of alcohols or alkyl halides with hydroxy aromatic compounds may also be isomerized by treatment with an activated clay and acid in the practice of the process.

While the invention has been discussed above principally with reference to manufacture of tertiary alkyl phenols by condensation of branched chain olefins with hydroxy aromatic compounds, straight chain olefins may also be condensed with such compounds to produce secondary alkyl phenols in the practice of the invention, and cyclic olefins such as cyclohexene may also be similarly condensed. When straight chain olefins or cyclic olefins are condensed with hydroxy aromatic compounds in the practice of the invention, however, it will ordinarily be desirable to use substantially larger quantities of catalysts, and more intense reaction conditions than those indicated above for manufacture of tertiary alkyl derivatives. The invention may also be practiced in alkylation of a hydroxy aromatic compound already substituted by an alkyl radical, a chlorine atom, a second hydroxyl group, etc., in order to introduce a second alkyl substituent.

While the invention may be practiced in most cases in which an acid catalyst is used in the initial condensation by retaining the acid catalyst after addition of clay in the isomerization step, the acid catalyst may be neutralized and removed between these two steps if desired. In some cases, it will be desirable to remove at least a part of the acid catalyst by washing as discussed above or neutralization prior to addition of clay and isomerization. This is especially true in connection with the manufacture of secondary alkyl phenols by condensation of straight chain olefins with hydroxy aromatic compounds, since in this reaction, it may be desirable to use as much as 10% of sulfuric acid in the initial condensation reaction, and it may then become desirable to remove a part of this acid before performance of the isomerization step.

It is not necessary that the same acid be used in the isomerization step as that employed in the initial condensation step, but it is desirable that a small proportion of acid be present along with the clay to assist in isomerization. While amounts of acid varying between 0.01% and 5% of the reaction mixture may be employed in this isomerization, the best results have been attained in cases in which the acid concentration amounted to at least 0.1% and preferably 0.25% or over, calculated as free sulfuric acid. It is ordinarily undesirable that an amount of sulfuric acid in excess of 5% be present in the isomerization step, since large excesses of acid result in loss of products due to sulfonation. An amount of free sulfuric acid in excess of 1.5% will ordinarily be unnecessary at this stage of the reaction.

While we do not wish to be limited as to any theory as to the reasons for the results attained in the practice of the invention, the clay and sulfuric acid appear to exert a co-catalytic effect in accomplishing the isomerization. In case relatively small quantities of acid are used in this isomerization step, the acid tends to disappear during the course of the isomerization. This is not entirely understood, but it is believed to be due partly to adsorption of the acid on the clay. Regardless of the cause of this phenomenon, however, the filtrate obtained after removal of the clay is practically neutral, and only small traces of alkali are required to throw the filtrate to the basic side.

A particular feature of the present invention consists in the fact that, by the performance of the sequence of steps discussed above, the production of the desired substituted phenols can be very much speeded up as compared to prior art processes, with a resultant economy in the use of equipment. A further feature consists in the fact that the performance of the time consuming washing steps of prior art processes is almost completely eliminated, in spite of the fact that the process provides a superior grade of substituted phenol to that obtained by these prior art processes. The substantial elimination of washing operations also results in an improvement of yield by avoidance of loss of valuable products ordinarily entailed by absorption of a part of the product in the wash waters.

While the invention has been discussed above principally with reference to the use of sulfuric acid, other acids capable of catalyzing alkylation of phenols may be employed either in the initial condensation step or in the subsequent isomerization step. Thus, hydrochloric acid, phosphoric acid, hydrofluoric acid, toluene sulfonic acid or other acid catalysts or equivalent acidic substances may be substituted for sulfuric acid in the practice of the process.

The following examples are illustrative of the conditions which may be employed in satisfactory practice of the invention.

*Example I*

1880 grams of phenol and 2800 grams of an amylene mixture containing approximately 50% branched chain amylenes and 50% n-amylenes were placed in a 12 liter flask and stirred during the addition of 20 cc. of concentrated sulfuric acid. Almost immediately reaction set in and this reaction was moderated by a reflux and external cooling to maintain the temperature of reaction at about 45° C. After about one hour and a half the exothermic reaction was found to have moderated and the cooling water was replaced with water at 45 to 50° C. After being allowed to stand overnight 10% by volume of water was added to the condensation mass and a wet distillation through a column was conducted. Two cuts were taken, the first being up to 40° C. and the second between 40° and 90° C. Examination of the cut up to 40° C. showed it to be of remarkable purity having an Engler distillation range between 34 and 36.6° C. Analysis of this cut indicated it to be almost pure pentene-2 with no detectible quantity of isoamylene present. The cut boiling between 40° and 90° C. was found to consist essentially of water and diamylene together with small amounts of hexane and hexylene which were present as impurities in the initial olefin mixture.

After removal of the 40 to 90° C. fraction the material was allowed to stand several minutes to permit separation of most of the water layer which had been added. The latter was decanted and was held for the next batch to be reused in the wet distillation of amylene and diamylene. The oil layer consisting of phenol, ortho-amylphenol, para-amylphenol, diamylphenol and traces of water and sulfuric acid was now transferred to a 3-neck five liter flask equipped with a reflux condenser and water trap, a thermometer well and a mercury-sealed stirrer. To the mixture was now added 2% of a finely powdered acid activated earth known as "Retrol" and the mixture was heated to 145° C., with stirring, removing the water as it distilled by means of the trap. When the temperature reached 145° C. it was permitted to remain at this level for a period of one hour. On cooling to 120° C. the reaction mass was filtered through a hot Buchner funnel to remove the clay. The filtrate was immediately transferred to a distillation flask and while still liquid neutralized by the addition of 10 cc. of 10% potassium hydroxide solution. Upon distillation at atmospheric pressure through a 150 cm. by 5 cm. helix-packed column there was obtained a 76% conversion to para-tertiary amylphenol boiling between 250 and 260° C. with a melting range of 85 to 91° C. The product was perfectly white. In addition moderate quantities of ortho-tertiary amylphenol and di-tertiary amylphenol were obtained in the distillation. These products may be reisomerized by addition to a subsequent batch being digested with clay.

2700 grams ortho-cresol and 3720 grams of mixed amylenes containing 45% by weight of branched chain amylenes are placed in a 12 liter flask and stirred during the addition of 25 cc. concentrated sulfuric acid. As in the previous example heat of reaction is dissipated during the initial stages of the condensation by external cooling. After about five hours at 45° C. the reaction is found to be complete and the unreacted n-olefin is removed by wet distillation. The oil layer is decanted and is isomerized with 2% of its weight of Retrol at 145 to 150° C. for one hour. After filtering to remove the clay the filtrate is made slightly alkaline by the addition of aqueous potassium hydroxide solution and distilled. An excellent yield of water-white para-tertiary-amyl-ortho-cresol is obtained boiling between 260 and 265° C. On cooling to somewhat below room temperature the amyl ortho-cresol solidifies.

Example III

A mixture of 205 grams (2.5 gram moles) of cyclohexene in 500 cc. of pentane is placed in a three-necked two liter flask with 230 grams (2.5 moles of phenol. The flask is equipped with a mercury sealed stirrer and is placed under a reflux condenser. A solution of 20 cc. of concentrated sulfuric acid in 60 grams of phenol is now added, with stirring, to the foregoing mixture. After the initial exothermic reaction is over the mass is refluxed for three hours and allowed to stand overnight. 100 cc. of water is now added to the mixture and pentane together with small quantities of unreacted cyclohexene is removed by distillation. The oily condensate remaining in the flask is decanted from the water and is isomerized by heating for two hours at 165° C. with 2% of its weight of Super-Filtrol, an acid activated type of contact clay. After filtration the filtrate is made neutral and subjected to a vacuum fractionation. Ortho-cyclohexylphenol boiling at about 145 to 150° C. at 10 mm. pressure may be separated from para-cyclohexylphenol boiling at about 160 to 170° C. at the same pressure. The para-cyclohexylphenol, which is obtained in the larger quantity, may be crystallized from hot carbon tetrachloride to obtain colorless crystals melting at 130 to 131° C.

Example IV 2240 grams of mixed liquid normal- and iso-butanes containing 1105 grams of isobutene are run into an autoclave together with 1880 grams of phenol. A test tube containing 20 cc. of concentrated sulfuric acid is attached to the stirrer of the autoclave in such a manner that upon starting the latter the tube will be broken. After cooling the mixture to 10° C. the breaking operation is conducted. Almost immediately an exothermic reaction sets in whereby a maximum temperature of about 65° C. is attained. Stirring is continued for fifteen minutes and the mixture is thereafter allowed to stand overnight. The reaction mixture is then cooled to 0° C., the autoclave opened and the condensation mass transferred to a twelve liter flask, 300 cc. of water is added, the butene-2 and butene-1 distilled off and the oily layer containing butylphenols decanted. It is now isomerized by heating, with stirring, with 2% of its weight of Attapulgus contact clay at 145° C. for one hour. The clay is filtered from the isomerized material and the filtrate made alkaline by the addition of 10 cc. of 10% sodium hydroxide solution. Distillation is then carried out at atmospheric pressure in the usual manner to afford a high conversion to para-tertiary butylphenol possessing a melting point of 96 to 98° C.

Example V

Mixed amylenes were contacted in successive portions with 62% sulfuric acid. The resulting solution of tertiary-amyl hydrogen sulfate and tertiary-amyl sulfate was then mixed with an appropriate quantity of phenol and allowed to stand for two hours. The oily phenolic layer was now removed and washed with successive portions of water until titration showed it to contain 0.3% free sulfuric acid. It was then treated with 2% of its weight of Retrol clay for two hours at 140° C., removing such water as was necessary to attain that temperature. After removal of the clay the material was made slightly alkaline by the addition of 10% potassium hydroxide solution and distilled. A 70% conversion to para-tertiary amylphenol melting between 82 and 92° C. was realized.

Modifications will be obvious to those skilled in the art and we do not therefore wish to be limited except by the scope of the following claims.

We claim:

1. The method of effecting reaction between an unsaturated hydrocarbon and an aromatic compound substituted in the nucleus by an hydroxyl radical which comprises effecting initial condensation between the aromatic compound and said unsaturated hydrocarbon in the presence of an acid catalyst, thereafter adding an activated clay to the intermediate condensation product so obtained while retaining at least a part of the acid catalyst in the reaction mixture, and effecting rearrangement of the reaction products by heating in the presence of said activated clay catalyst and said retained acid to produce the desired para-alkyl phenol.

2. The method of effecting selective reaction between a portion of an unsaturated hydrocarbon mixture and an aromatic compound substituted in the nucleus by an hydroxyl radical which comprises effecting initial condensation between the aromatic compound and the more reactive portion of said unsaturated hydrocarbon mixture in the presence of an acid catalyst under conditions controlled to substantially preclude reaction between said aromatic compound and the less reactive portion of said unsaturated hydrocarbon mixture, removing the uncondensed portion of the hydrocarbon mixture while retaining at least a part of the acid catalyst in the intermediate condensation product so obtained, and thereafter adding an activated clay to the resulting mixture of intermediate condensation product and acid and heating the resulting mixture to effect rearrangement of said intermediate reaction mixture in the presence of said activated clay and acid to produce the desired para-alkyl phenol.

3. The method of effecting selective reaction between a portion of an unsaturated olefin mixture and an aromatic compound substituted in the nucleus by an hydroxyl radical which comprises effecting initial condensation between the aromatic compound and the more reactive portion of said unsaturated olefin mixture in the presence of an acid catalyst under conditions controlled to substantially preclude reaction between said aromatic compound and the less reactive portion of said unsaturated olefin mixture, removing the uncondensed portion of the olefin mixture while retaining at least a part of the acid catalyst in the intermediate condensation product so obtained, and thereafter adding an activated clay to the resulting mixture of intermediate condensation product and acid and heating the resulting mixture to effect rearrangement of said intermediate reaction mixture in the presence of said activated clay and acid to produce the desired para-alkyl phenol.

4. In the manufacture of tertiary alkyl phenols, the process comprising reacting a branch chain olefin and an aromatic compound substituted in the nucleus by an hydroxyl radical by effecting initial condensation between said aromatic compound and said olefin in the presence of an acid catalyst and thereafter effecting rearrangement of the reaction products so produced by heating in the presence of an activated clay catalyst and the catalyst used in the initial condensation reaction to produce the desired para-tertiary alkyl phenol.

5. In the manufacture of tertiary alkyl phenols, the process comprising reacting a branch chain olefin and an aromatic compound substituted in the nucleus by an hydroxyl radical by effecting initial condensation between said aromatic compound and said olefin in the presence of a sulfuric acid catalyst and thereafter effecting rearrangement of the reaction products so produced by heating in the presence of an activated clay catalyst and the sulfuric acid catalyst used in the initial condensation reaction to produce the desired para-tertiary alkyl phenol.

6. The method of effecting isomerization of intermediate phenolic condensation products formed in condensation of hydroxy aromatic compounds with compounds chosen from the class consisting of olefins, alkyl halides, and aliphatic alcohols, which consists in heating said intermediate condensation products in the presence of an activated clay and an acid condensation catalyst to produce the desired para-alkyl phenol.

7. The method of effecting isomerization of intermediate phenolic condensation products formed in condensation of hydroxy aromatic compounds with compounds chosen from the class consisting of olefins, alkyl halides, and aliphatic alcohols, which consists in heating said intermediate condensation products in the presence of an activated clay and sulfuric acid to produce the desired para-alkyl phenol.

8. The method of effecting isomerization of intermediate phenolic condensation products formed in condensation of hydroxy aromatic compounds with compounds chosen from the class consisting of olefins, alkyl halides, and aliphatic alcohols, which consists in heating said intermediate condensation products in the presence of an activated clay and an amount of sulfuric acid constituting between 0.25 and 5% of the intermediate phenolic condensation products being subjected to the isomerization reaction to produce the desired para-alkyl phenol.

9. The method of effecting selective reaction between a portion of an unsaturated hydrocarbon mixture and an aromatic compound substituted in the nucleus by an hydroxyl radical which comprises effecting initial condensation between the aromatic compound and the more reactive portion of said unsaturated hydrocarbon mixture in the presence of an acid catalyst under conditions controlled to substantially preclude reaction between said aromatic compound and the less reactive portion of said unsaturated hydrocarbon mixture, adding water to the intermediate reaction mixture so formed, removing the uncondensed portion of the hydrocarbon mixture by distillation together with added water, and thereafter effecting rearrangement of the remaining reaction products by heating in the presence of an activated clay catalyst and acid remaining in the reaction mixture to produce the desired para-alkyl phenol.

10. The method of effecting isomerization of intermediate phenolic condensation products formed in condensation of hydroxy aromatic compounds with compounds chosen from the class consisting of olefins, alkyl halides, and aliphatic alcohols, which consists in heating said intermediate condensation products in the presence of an activated clay and an amount of sulfuric acid constituting at least 0.1% of the intermediate phenolic condensation products being subjected to the isomerization reaction to produce the desired para-alkyl phenol.

JOHN FRANK OLIN.
JOHN L. TETLEY.